(12) United States Patent
Alvarado et al.

(10) Patent No.: US 10,081,129 B1
(45) Date of Patent: Sep. 25, 2018

(54) ADDITIVE MANUFACTURING SYSTEM IMPLEMENTING HARDENER PRE-IMPREGNATION

(71) Applicant: CC3D LLC, Coeur d'Alene, ID (US)

(72) Inventors: Tyler B. Alvarado, Coeur d'Alene, ID (US); Trevor David Budge, Coeur d'Alene, ID (US); Ryan C Stockett, Lebanon, NH (US); John Swallow, Coeur d'Alene, ID (US)

(73) Assignee: CC3D LLC, Coeur d'Alene, ID (US)

( * ) Notice: Subject to any disclaimer, the term of this patent is extended or adjusted under 35 U.S.C. 154(b) by 0 days.

(21) Appl. No.: 15/858,445

(22) Filed: Dec. 29, 2017

(51) Int. Cl.
| | |
|---|---|
| *B29B 15/12* | (2006.01) |
| *B29B 15/14* | (2006.01) |
| *B29C 70/16* | (2006.01) |
| *B29C 70/20* | (2006.01) |
| *B29C 64/118* | (2017.01) |
| *B29C 64/209* | (2017.01) |

(Continued)

(52) U.S. Cl.
CPC ............ *B29C 64/118* (2017.08); *B22F 3/008* (2013.01); *B29B 15/122* (2013.01); *B29C 31/042* (2013.01); *B29C 31/045* (2013.01); *B29C 31/048* (2013.01); *B29C 64/106* (2017.08); *B29C 64/209* (2017.08); *B29C 70/205* (2013.01); *B33Y 10/00* (2014.12); *B33Y 30/00* (2014.12); *B33Y 70/00* (2014.12); *B29C 64/393* (2017.08); *B33Y 50/02* (2014.12)

(58) Field of Classification Search
CPC ....... B29B 15/12; B29B 15/122; B29B 15/14; B29C 31/042; B29C 31/045; B29C 31/048; B29C 64/106; B29C 64/118; B29C 70/16; B29C 70/20; B29C 70/205; B33Y 10/00

USPC .......................... 264/134, 135, 136, 137, 308
See application file for complete search history.

(56) References Cited

U.S. PATENT DOCUMENTS

| | | | |
|---|---|---|---|
| 3,286,305 | A | 11/1966 | Seckel |
| 3,809,514 | A | 5/1974 | Nunez |

(Continued)

FOREIGN PATENT DOCUMENTS

| | | |
|---|---|---|
| DE | 4102257 A1 | 7/1992 |
| EP | 2589481 B1 | 1/2016 |

(Continued)

OTHER PUBLICATIONS

A. Di. Pietro & Paul Compston, Resin Hardness and Interlaminar Shear Strength of a Glass-Fibre/Vinylester Composite Cured with High Intensity Ultraviolet (UV) Light, Journal of Materials Science, vol. 44, pp. 4188-4190 (Apr. 2009).

(Continued)

*Primary Examiner* — Leo B Tentoni
(74) *Attorney, Agent, or Firm* — Ryan C. Stockett

(57) ABSTRACT

A method is disclosed for additively manufacturing a composite structure. The method may include directing a continuous reinforcement into a print head, and coating the continuous reinforcement with a first matrix component inside of the print head. The method may further include coating the continuous reinforcement with a second matrix component, discharging the continuous reinforcement through a nozzle of the print head, and moving the print head in multiple dimensions during the discharging. The first and second matrix components interact to cause hardening of a matrix around the continuous reinforcement.

20 Claims, 4 Drawing Sheets

(51) Int. Cl.
  *B33Y 10/00* (2015.01)
  *B33Y 70/00* (2015.01)
  *B22F 3/00* (2006.01)
  *B33Y 30/00* (2015.01)
  *B29C 31/04* (2006.01)
  *B29C 64/106* (2017.01)
  *B33Y 50/02* (2015.01)
  *B29C 64/393* (2017.01)

(56) References Cited

U.S. PATENT DOCUMENTS

| | | |
|---|---|---|
| 3,984,271 A | 10/1976 | Gilbu |
| 3,993,726 A | 11/1976 | Moyer |
| 4,643,940 A | 2/1987 | Shaw et al. |
| 4,671,761 A | 6/1987 | Adrian et al. |
| 4,822,548 A | 4/1989 | Hempel |
| 4,851,065 A | 7/1989 | Curtz |
| 5,002,712 A | 3/1991 | Goldmann et al. |
| 5,037,691 A | 8/1991 | Medney et al. |
| 5,296,335 A | 3/1994 | Thomas et al. |
| 5,340,433 A | 8/1994 | Crump |
| 5,746,967 A | 5/1998 | Hoy et al. |
| 5,866,058 A | 2/1999 | Batchelder et al. |
| 5,936,861 A | 8/1999 | Jang et al. |
| 6,153,034 A | 11/2000 | Lipsker |
| 6,459,069 B1 | 10/2002 | Rabinovich |
| 6,501,554 B1 | 12/2002 | Hackney et al. |
| 6,799,081 B1 | 9/2004 | Hale et al. |
| 6,803,003 B2 | 10/2004 | Rigali et al. |
| 6,934,600 B2 | 8/2005 | Jang et al. |
| 7,039,485 B2 | 5/2006 | Engelbart et al. |
| 7,555,404 B2 | 6/2009 | Brennan et al. |
| 7,795,349 B2 | 9/2010 | Bredt et al. |
| 8,221,669 B2 | 7/2012 | Batchelder et al. |
| 8,962,717 B2 | 2/2015 | Roth et al. |
| 9,126,365 B1 | 9/2015 | Mark et al. |
| 9,126,367 B1 | 9/2015 | Mark et al. |
| 9,149,988 B2 | 10/2015 | Mark et al. |
| 9,156,205 B2 | 10/2015 | Mark et al. |
| 9,186,846 B1 | 11/2015 | Mark et al. |
| 9,186,848 B2 | 11/2015 | Mark et al. |
| 9,327,452 B2 | 5/2016 | Mark et al. |
| 9,327,453 B2 | 5/2016 | Mark et al. |
| 9,370,896 B2 | 6/2016 | Mark |
| 9,381,702 B2 | 7/2016 | Hollander |
| 9,457,521 B2 | 10/2016 | Johnston et al. |
| 9,458,955 B2 | 10/2016 | Hammer et al. |
| 9,527,248 B2 | 12/2016 | Hollander |
| 9,539,762 B2 | 1/2017 | Durand et al. |
| 9,579,851 B2 | 2/2017 | Mark et al. |
| 9,688,028 B2 | 6/2017 | Mark et al. |
| 9,694,544 B2 | 7/2017 | Mark et al. |
| 9,764,378 B2 | 9/2017 | Peters et al. |
| 9,770,876 B2 | 9/2017 | Farmer et al. |
| 9,782,926 B2 | 10/2017 | Witzel et al. |
| 2002/0009935 A1 | 1/2002 | Hsiao et al. |
| 2002/0062909 A1 | 5/2002 | Jang et al. |
| 2002/0113331 A1 | 8/2002 | Zhang et al. |
| 2002/0165304 A1 | 11/2002 | Mulligan et al. |
| 2003/0044539 A1 | 3/2003 | Oswald |
| 2003/0056870 A1 | 3/2003 | Comb et al. |
| 2003/0160970 A1 | 8/2003 | Basu et al. |
| 2003/0186042 A1 | 10/2003 | Dunlap et al. |
| 2003/0236588 A1 | 12/2003 | Jang et al. |
| 2005/0006803 A1 | 1/2005 | Owens |
| 2005/0061422 A1 | 3/2005 | Martin |
| 2005/0104257 A1 | 5/2005 | Gu et al. |
| 2005/0109451 A1 | 5/2005 | Hauber et al. |
| 2005/0230029 A1 | 10/2005 | Vaidyanathan et al. |
| 2007/0003650 A1 | 1/2007 | Schroeder |
| 2007/0228592 A1 | 10/2007 | Dunn et al. |
| 2008/0176092 A1 | 7/2008 | Owens |
| 2009/0095410 A1 | 4/2009 | Oldani |
| 2011/0032301 A1 | 2/2011 | Fienup et al. |
| 2011/0143108 A1 | 6/2011 | Fruth et al. |
| 2012/0060468 A1 | 3/2012 | Dushku et al. |
| 2012/0159785 A1 | 6/2012 | Pyles et al. |
| 2012/0231225 A1 | 9/2012 | Mikulak et al. |
| 2012/0247655 A1 | 10/2012 | Erb et al. |
| 2013/0164498 A1 | 6/2013 | Langone et al. |
| 2013/0209600 A1 | 8/2013 | Tow |
| 2013/0233471 A1 | 9/2013 | Kappesser et al. |
| 2013/0292039 A1 | 11/2013 | Peters et al. |
| 2013/0337256 A1 | 12/2013 | Farmer et al. |
| 2013/0337265 A1 | 12/2013 | Farmer |
| 2014/0034214 A1 | 2/2014 | Boyer et al. |
| 2014/0061974 A1 | 3/2014 | Tyler |
| 2014/0159284 A1 | 6/2014 | Leavitt |
| 2014/0232035 A1 | 8/2014 | Bheda |
| 2014/0268604 A1 | 9/2014 | Wicker et al. |
| 2014/0291886 A1 | 10/2014 | Mark et al. |
| 2015/0136455 A1 | 5/2015 | Fleming |
| 2016/0012935 A1 | 1/2016 | Rothfuss |
| 2016/0031155 A1 | 2/2016 | Tyler |
| 2016/0046082 A1 | 2/2016 | Fuerstenberg |
| 2016/0052208 A1 | 2/2016 | Debora et al. |
| 2016/0082641 A1 | 3/2016 | Bogucki et al. |
| 2016/0082659 A1 | 3/2016 | Hickman et al. |
| 2016/0107379 A1 | 4/2016 | Mark et al. |
| 2016/0114532 A1 | 4/2016 | Schirtzinger et al. |
| 2016/0136885 A1 | 5/2016 | Nielsen-Cole et al. |
| 2016/0144565 A1 | 5/2016 | Mark et al. |
| 2016/0144566 A1 | 5/2016 | Mark et al. |
| 2016/0192741 A1 | 7/2016 | Mark |
| 2016/0200047 A1 | 7/2016 | Mark et al. |
| 2016/0243762 A1 | 8/2016 | Fleming et al. |
| 2016/0263806 A1 | 9/2016 | Gardiner |
| 2016/0263822 A1 | 9/2016 | Boyd |
| 2016/0263823 A1 | 9/2016 | Espiau et al. |
| 2016/0271876 A1 | 9/2016 | Lower |
| 2016/0297104 A1 | 10/2016 | Guillemette et al. |
| 2016/0311165 A1 | 10/2016 | Mark et al. |
| 2016/0325491 A1 | 11/2016 | Sweeney et al. |
| 2016/0332369 A1 | 11/2016 | Shah et al. |
| 2016/0339633 A1 | 11/2016 | Stolyarov et al. |
| 2016/0346998 A1 | 12/2016 | Mark et al. |
| 2016/0361869 A1 | 12/2016 | Mark et al. |
| 2016/0368213 A1 | 12/2016 | Mark |
| 2016/0368255 A1 | 12/2016 | Witte et al. |
| 2017/0007359 A1 | 1/2017 | Kopelman et al. |
| 2017/0007360 A1 | 1/2017 | Kopelman et al. |
| 2017/0007361 A1 | 1/2017 | Boronkay et al. |
| 2017/0007362 A1 | 1/2017 | Chen et al. |
| 2017/0007363 A1 | 1/2017 | Boronkay |
| 2017/0007365 A1 | 1/2017 | Kopelman et al. |
| 2017/0007366 A1 | 1/2017 | Kopelman et al. |
| 2017/0007367 A1 | 1/2017 | Li et al. |
| 2017/0007368 A1 | 1/2017 | Boronkay |
| 2017/0007386 A1 | 1/2017 | Mason et al. |
| 2017/0008333 A1 | 1/2017 | Mason et al. |
| 2017/0015059 A1 | 1/2017 | Lewicki |
| 2017/0015060 A1 | 1/2017 | Lewicki et al. |
| 2017/0021565 A1 | 1/2017 | Deaville |
| 2017/0028434 A1 | 2/2017 | Evans et al. |
| 2017/0028588 A1 | 2/2017 | Evans et al. |
| 2017/0028617 A1 | 2/2017 | Evans et al. |
| 2017/0028619 A1 | 2/2017 | Evans et al. |
| 2017/0028620 A1 | 2/2017 | Evans et al. |
| 2017/0028621 A1 | 2/2017 | Evans et al. |
| 2017/0028623 A1 | 2/2017 | Evans et al. |
| 2017/0028624 A1 | 2/2017 | Evans et al. |
| 2017/0028625 A1 | 2/2017 | Evans et al. |
| 2017/0028627 A1 | 2/2017 | Evans et al. |
| 2017/0028628 A1 | 2/2017 | Evans et al. |
| 2017/0028633 A1 | 2/2017 | Evans et al. |
| 2017/0028634 A1 | 2/2017 | Evans et al. |
| 2017/0028635 A1 | 2/2017 | Evans et al. |
| 2017/0028636 A1 | 2/2017 | Evans et al. |
| 2017/0028637 A1 | 2/2017 | Evans et al. |
| 2017/0028638 A1 | 2/2017 | Evans et al. |
| 2017/0028639 A1 | 2/2017 | Evans et al. |
| 2017/0028644 A1 | 2/2017 | Evans et al. |
| 2017/0030207 A1 | 2/2017 | Kittleson |

(56) References Cited

U.S. PATENT DOCUMENTS

| | | |
|---|---|---|
| 2017/0036403 A1 | 2/2017 | Ruff et al. |
| 2017/0050340 A1 | 2/2017 | Hollander |
| 2017/0057164 A1 | 3/2017 | Hemphill et al. |
| 2017/0057165 A1 | 3/2017 | Waldrop et al. |
| 2017/0057167 A1 | 3/2017 | Tooren et al. |
| 2017/0057181 A1 | 3/2017 | Waldrop et al. |
| 2017/0064840 A1 | 3/2017 | Espalin et al. |
| 2017/0066187 A1 | 3/2017 | Mark et al. |
| 2017/0087768 A1 | 3/2017 | Bheda |
| 2017/0106565 A1 | 4/2017 | Braley et al. |
| 2017/0120519 A1 | 5/2017 | Mark |
| 2017/0129170 A1 | 5/2017 | Kim et al. |
| 2017/0129171 A1 | 5/2017 | Gardner et al. |
| 2017/0129176 A1 | 5/2017 | Waatti et al. |
| 2017/0129182 A1 | 5/2017 | Sauti et al. |
| 2017/0129186 A1 | 5/2017 | Sauti et al. |
| 2017/0144375 A1 | 5/2017 | Waldrop et al. |
| 2017/0151728 A1 | 6/2017 | Kunc et al. |
| 2017/0157828 A1 | 6/2017 | Mandel et al. |
| 2017/0157831 A1 | 6/2017 | Mandel et al. |
| 2017/0157844 A1 | 6/2017 | Mandel et al. |
| 2017/0157851 A1 | 6/2017 | Nardiello et al. |
| 2017/0165908 A1 | 6/2017 | Pattinson et al. |
| 2017/0173868 A1 | 6/2017 | Mark |
| 2017/0182712 A1 | 6/2017 | Scribner et al. |
| 2017/0210074 A1 | 7/2017 | Ueda et al. |
| 2017/0217088 A1 | 8/2017 | Boyd et al. |
| 2017/0232674 A1 | 8/2017 | Mark |
| 2017/0259502 A1 | 9/2017 | Chapiro et al. |
| 2017/0259507 A1 | 9/2017 | Hocker |
| 2017/0266876 A1 | 9/2017 | Hocker |
| 2017/0274585 A1 | 9/2017 | Armijo et al. |
| 2017/0284876 A1 | 10/2017 | Moorlag et al. |
| 2018/0065300 A1* | 3/2018 | Tyler ................ B33Y 10/00 |

FOREIGN PATENT DOCUMENTS

| | | |
|---|---|---|
| EP | 3219474 A1 | 9/2017 |
| KR | 100995983 B1 | 11/2010 |
| KR | 101172859 B1 | 8/2012 |
| WO | 2013017284 A2 | 2/2013 |
| WO | 2016088042 A1 | 6/2016 |
| WO | 2016088048 A1 | 6/2016 |
| WO | 2016110444 A1 | 7/2016 |
| WO | 2016159259 A1 | 10/2016 |
| WO | 2016196382 A1 | 12/2016 |
| WO | 2017006178 A1 | 1/2017 |
| WO | 2017006324 A1 | 1/2017 |
| WO | 2017051202 A1 | 3/2017 |
| WO | 2017081253 A1 | 5/2017 |
| WO | 2017085649 A1 | 5/2017 |
| WO | 2017087663 A1 | 5/2017 |
| WO | 2017108758 A1 | 6/2017 |
| WO | 2017122941 A1 | 7/2017 |
| WO | 2017122942 A1 | 7/2017 |
| WO | 2017122943 A1 | 7/2017 |
| WO | 2017123726 A1 | 7/2017 |
| WO | 2017124085 A1 | 7/2017 |
| WO | 2017126476 A1 | 7/2017 |
| WO | 2017126477 A1 | 7/2017 |
| WO | 2017137851 A2 | 8/2017 |
| WO | 2017142867 A1 | 8/2017 |
| WO | 2017150186 A1 | 9/2017 |

OTHER PUBLICATIONS

A. Endruweit, M. S. Johnson, & A. C. Long, Curing of Composite Components by Ultraviolet Radiation: A Review, Polymer Composites, pp. 119-128 (Apr. 2006).

C. Fragassa, & G. Minak, Standard Characterization for Mechanical Properties of Photopolymer Resins for Rapid Prototyping, 1st Symposium on Multidisciplinary Studies of Design in Mechanical Engineering, Bertinoro, Italy (Jun. 25-28, 2008).

Hyouk Ryeol Choi and Se-gon Roh, In-pipe Robot with Active Steering Capability for Moving Inside of Pipelines, Bioinspiration and Robotics: Walking and Climbing Robots, Sep. 2007, p. 544, I-Tech, Vienna, Austria.

Kenneth C. Kennedy II & Robert P. Kusy, UV-Cured Pultrusion Processing of Glass-Reinforced Polymer Composites, Journal of Vinyl and Additive Technology, vol. 1, Issue 3, pp. 182-186 (Sep. 1995).

M. Martin-Gallego et al., Epoxy-Graphene UV-Cured Nanocomposites, Polymer, vol. 52, Issue 21, pp. 4664-4669 (Sep. 2011).

P. Compston, J. Schiemer, & A. Cvetanovska, Mechanical Properties and Styrene Emission Levels of a UV-Cured Glass-Fibre/Vinylester Composite, Composite Structures, vol. 86, pp. 22-26 (Mar. 2008).

S Kumar & J.-P. Kruth, Composites by Rapid Prototyping Technology, Materials and Design, (Feb. 2009).

S. L. Fan, F. Y. C. Boey, & M. J. M. Abadie, UV Curing of a Liquid Based Bismaleimide-Containing Polymer System, eXPRESS Polymer Letters, vol. 1, No. 6, pp. 397-405 (2007).

T. M. Llewelly-Jones, Bruce W. Drinkwater, and Richard S. Trask; 3D Printed Components With Ultrasonically Arranged Microscale Structure, Smart Materials and Structures, 2016, pp. 1-6, vol. 25, IOP Publishing Ltd., UK.

Vincent J. Lopata et al., Electron-Beam-Curable Epoxy Resins for the Manufacture of High-Performance Composites, Radiation Physics and Chemistry, vol. 56, pp. 405-415 (1999).

Yugang Duan et al., Effects of Compaction and UV Exposure on Performance of Acrylate/Glass-Fiber Composites Cured Layer by Layer, Journal of Applied Polymer Science, vol. 123, Issue 6, pp. 3799-3805 (May 15, 2012).

* cited by examiner

ADDITIVE MANUFACTURING SYSTEM IMPLEMENTING HARDENER PRE-IMPREGNATION

TECHNICAL FIELD

The present disclosure relates generally to a manufacturing system and, more particularly, to an additive manufacturing system implementing hardener pre-impregnation.

BACKGROUND

Traditional additive manufacturing is a process of creating three-dimensional parts by depositing overlapping layers of material under the guided control of a computer. A common form of additive manufacturing is known as fused deposition modeling (FDM). Using FDM, a thermoplastic is passed through and liquified within a heated print head. The print head is moved in a predefined trajectory (a.k.a., a tool path) as the material discharges from the print head, such that the material is laid down in a particular pattern and shape of overlapping 2-dimensional layers. The material, after exiting the print head, cools and hardens into a final form. A strength of the final form is primarily due to properties of the particular thermoplastic supplied to the print head and a 3-dimensional shape formed by the stack of 2-dimensional layers.

A recently developed improvement over traditional FDM manufacturing involves the use of continuous fibers embedded within material discharging from the print head (a.k.a., Continuous Fiber 3D Printing—CF3D™). In particular, a matrix is supplied to the print head and discharged (e.g., extruded and/or pultruded) along with one or more continuous fibers also passing through the same head at the same time. The matrix can be a traditional thermoplastic, a powdered metal, a liquid matrix (e.g., a UV curable and/or two-part resin), or a combination of any of these and other known matrixes. Upon exiting the print head, a cure enhancer (e.g., a UV light, an ultrasonic emitter, a heat source, a catalyst supply, etc.) is activated to initiate and/or complete curing of the matrix. This curing occurs almost immediately, allowing for unsupported structures to be fabricated in free space. And when fibers, particularly continuous fibers, are embedded within the structure, a strength of the structure may be multiplied beyond the matrix-dependent strength. An example of this technology is disclosed in U.S. Pat. No. 9,511,543 that issued to Tyler on Dec. 6, 2016 ("the '543 patent").

In some applications involving opaque fibers (e.g., carbon fibers), high-density fibers, high-concentrations of fibers, large-diameter fibers, etc., it can be difficult for the matrix material located at a center of the corresponding fiber bundle to receive sufficient cure enhancement (e.g., sufficient cure energy, catalyst, etc.). If unaccounted for, the resulting structure may lack strength and/or sag undesirably.

The disclosed system is directed to addressing one or more of the problems set forth above and/or other problems of the prior art.

SUMMARY

In one aspect, the present disclosure is directed to a method of additively manufacturing a composite structure. The method may include directing a continuous reinforcement into a print head, and coating the continuous reinforcement with a first matrix component inside of the print head. The method may further include coating the continuous reinforcement with a second matrix component, discharging the continuous reinforcement through a nozzle of the print head, and moving the print head in multiple dimensions during the discharging. The first and second matrix components interact to cause hardening of a matrix around the continuous reinforcement.

In another aspect, the present disclosure is directed to a system for additively manufacturing a composite structure. The system may include a support, and a print head connected to an end of the support. The print head may have a body with a chamber, in which a continuous reinforcement is coated with one of a resin and a catalyst. The print head may also include a nozzle connected to a discharge end of the body and configured to discharge the continuous reinforcement coated in both the resin and the catalyst. The system may further include a controller in communication with the support and the head. The controller may be configured to selectively cause the support to move the head in multiple dimensions during discharge of the continuous reinforcement from the nozzle, according to specifications for the composite structure.

In yet another aspect, the present disclosure is directed to a prepreg material for use in additively manufacturing a composite structure. The prepreg material may include a continuous reinforcement, and a catalyst of a multi-part matrix. The multi-part matrix, which also includes at least a resin, is curable around the continuous reinforcement to form the composite structure. The reinforcement is at least partially saturated with the catalyst and substantially free of the resin prior to manufacture of the composite structure, and the reinforcement makes up about 35-70% of the composite structure. The catalyst makes up about 0.1-10% of the composite structure.

DETAILED DESCRIPTION

Figure 1:
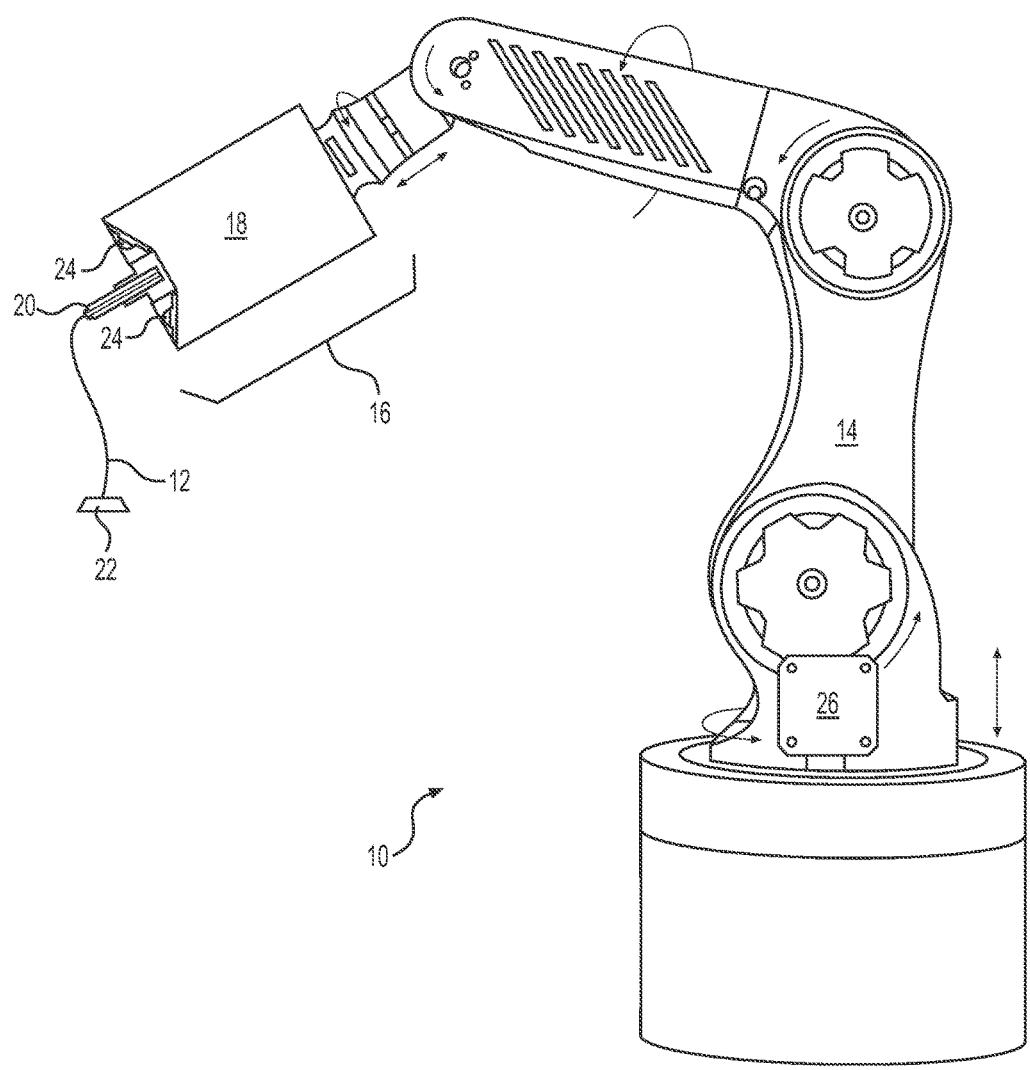
FIG. 1 is a diagrammatic illustration of an exemplary disclosed manufacturing system.

FIG. 1 illustrates an exemplary system 10, which may be used to continuously manufacture a composite structure 12 having any desired cross-sectional shape (e.g., circular, polygonal, etc.). System 10 may include at least a support 14 and a head 16. Head 16 may have a body 18 that is coupled to and moved by support 14, and a nozzle 20 located at an opposing discharge end of body 18. In the disclosed embodiment of FIG. 1, support 14 is a robotic arm capable of moving head 16 in multiple directions during fabrication of structure 12, such that a resulting longitudinal axis of structure 12 is three-dimensional. It is contemplated, however, that support 14 could alternatively be an overhead gantry or a hybrid gantry/arm also capable of moving head 16 in multiple directions during fabrication of structure 12. Although support 14 is shown as being capable of 6-axis movements, it is contemplated that any other type of support 14 capable of moving head 16 in the same or in a different manner could also be utilized, if desired. In some embodiments, a drive may mechanically couple head 16 to support 14, and may include components that cooperate to move and/or supply power or materials to head 16.

Body 18 may be configured to receive or otherwise contain a matrix material. The matrix material may include any type of matrix material (e.g., a liquid resin, such as a zero volatile organic compound resin; a powdered metal; etc.) that is curable. Exemplary resins include thermosets, single- or multi-part epoxy resins, polyester resins, cationic epoxies, acrylated epoxies, urethanes, esters, thermoplastics, photopolymers, polyepoxides, thiols, alkenes, thiol-enes, and more. In one embodiment, the matrix material inside body 18 may be pressurized, for example by an external device (e.g., an extruder or another type of pump—not shown) that is fluidly connected to head 16 via a corresponding conduit (not shown). In another embodiment, however, the pressure may be generated completely inside of body 18 by a similar type of device. In yet other embodiments, the matrix material may be gravity-fed through and/or mixed within body 18. In some instances, the matrix material inside body 18 may need to be kept cool and/or dark to inhibit premature curing; while in other instances, the matrix material may need to be kept warm for the same reason. In either situation, body 18 may be specially configured (e.g., insulated, chilled, and/or warmed) to provide for these needs.

The matrix material may be used to coat, encase, or otherwise surround any number of continuous reinforcements (e.g., separate fibers, tows, rovings, and/or sheets of material) and, together with the reinforcements, make up at least a portion (e.g., a wall) of composite structure 12. The reinforcements may be stored within (e.g., on separate internal spools—not shown) or otherwise passed through body 18 (e.g., fed from external spools 21—See FIGS. 2-4). When multiple reinforcements are simultaneously used, the reinforcements may be of the same type and have the same diameter and cross-sectional shape (e.g., circular, square, flat, etc.), or of a different type with different diameters and/or cross-sectional shapes. The reinforcements may include, for example, carbon fibers, vegetable fibers, wood fibers, mineral fibers, glass fibers, metallic wires, optical tubes, etc. It should be noted that the term "reinforcement" is meant to encompass both structural and non-structural types of continuous materials that can be at least partially encased in the matrix material discharging from nozzle 20.

The reinforcements may be exposed to (e.g., coated with) the matrix material while the reinforcements are passing through body 18. The matrix material, dry reinforcements, and/or reinforcements that are already exposed to the matrix material (e.g., wetted reinforcements) may be transported into body 18 in any manner apparent to one skilled in the art.

The matrix material and reinforcement may be discharged from nozzle 20 via at least two different modes of operation. In a first mode of operation, the matrix material and reinforcement are extruded (e.g., pushed under pressure and/or mechanical force) from nozzle 20, as head 16 is moved by support 14 to create the 3-dimensional shape of structure 12. In a second mode of operation, at least the reinforcement is pulled from nozzle 20, such that a tensile stress is created in the reinforcement during discharge. In this mode of operation, the matrix material may cling to the reinforcement and thereby also be pulled from nozzle 20 along with the reinforcement, and/or the matrix material may be discharged from nozzle 20 under pressure along with the pulled reinforcement. In the second mode of operation, where the matrix material is being pulled from nozzle 20, the resulting tension in the reinforcement may increase a strength of structure 12, while also allowing for a greater length of unsupported material to have a straighter trajectory (i.e., the tension may act against the force of gravity to provide free-standing support for structure 12).

The reinforcement may be pulled from nozzle 20 as a result of head 16 moving away from an anchor point 22. In particular, at the start of structure-formation, a length of matrix-impregnated reinforcement may be pulled and/or pushed from nozzle 20, deposited onto anchor point 22, and cured, such that the discharged material adheres to anchor point 22. Thereafter, head 16 may be moved away from anchor point 22, and the relative movement may cause the reinforcement to be pulled from nozzle 20. It should be noted that the movement of reinforcement through body 18 could be assisted (e.g., via one or more internal and/or external feed mechanisms—not shown), if desired. However, the discharge rate of reinforcement from nozzle 20 may primarily be the result of relative movement between head 16 and anchor point 22, such that tension is created and maintained within the reinforcement. It is contemplated that anchor point 22 could be moved away from head 16 instead of or in addition to head 16 being moved away from anchor point 22.

One or more cure enhancers (e.g., a UV light, an ultrasonic emitter, a laser, a heater, a catalyst dispenser, etc.) 24 may be mounted proximate (e.g., within, on, and/or trailing from) head 16 (e.g., at a base of body 18, inside of body 18, outside of body 18, or otherwise adjacent nozzle 20) and configured to enhance a cure rate and/or quality of the matrix material as it is discharged from head 16. Cure enhancer 24 may be controlled to selectively expose internal and/or external surfaces of structure 12 to energy (e.g., UV light, electromagnetic radiation, vibrations, heat, a chemical catalyst, hardener, or initiator, etc.) during the formation of structure 12. The energy may increase a rate of chemical reaction occurring within the matrix material, sinter the material, harden the material, or otherwise cause the material to cure as it discharges from head 16.

A controller 26 may be provided and communicatively coupled with support 14, head 16, and any number and type of cure enhancers 24. Controller 26 may embody a single processor or multiple processors that include a means for controlling an operation of system(s) 10 and/or 12. Controller 26 may include one or more general- or special-purpose processors or microprocessors. Controller 26 may further include or be associated with a memory for storing data such as, for example, design limits, performance characteristics, operational instructions, matrix characteristics, reinforcement characteristics, characteristics of structure 12, and corresponding parameters of each component of system 10. Various other known circuits may be associated with controller 26, including power supply circuitry, signal-conditioning circuitry, solenoid/motor driver circuitry, communication circuitry, and other appropriate circuitry. Moreover, controller 26 may be capable of communicating with other components of system 10 via wired and/or wireless transmission.

One or more maps may be stored in the memory of controller 26 and used during fabrication of structure 12. Each of these maps may include a collection of data in the form of lookup tables, graphs, and/or equations. In the disclosed embodiment, the maps are used by controller 26 to determine desired characteristics of cure enhancers 24, the associated matrix, and/or the associated reinforcements at different locations within structure 12. The characteristics may include, among others, a type, quantity, and/or configuration of reinforcement and/or matrix to be discharged at a particular location within structure 12, and/or an amount, shape, and/or location of desired curing. Controller 26 may then correlate operation of support 14 (e.g., the location and/or orientation of head 16) and/or the discharge of material from nozzle 20 (a type of material, desired performance of the material, cross-linking requirements of the material, a discharge rate, etc.) with the operation of cure enhancers 24 such that structure 12 is produced in a desired manner.

Figure 2:
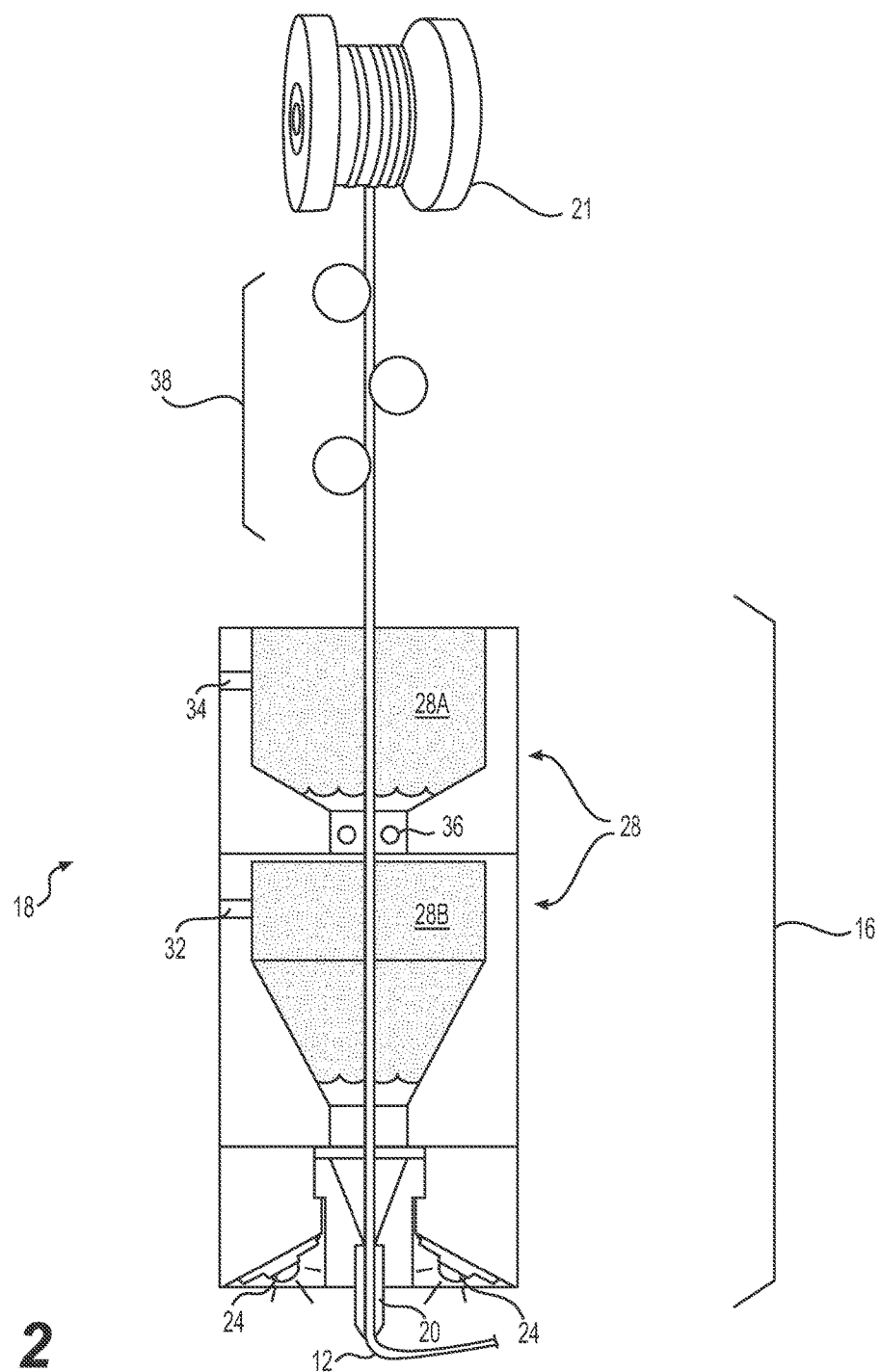
FIGS. 2-4 are diagrammatic illustrations an exemplary disclosed heads that may be used in conjunction with the manufacturing system of FIG. 1.

In some applications, care must be taken to ensure that each of the fibers passing through head 16 are sufficiently coated with matrix material (i.e., coated sufficient to ensure proper bonding and curing) prior to discharge from nozzle 20. As shown in FIG. 2, the fibers may be exposed to the matrix material during travel through one or more chambers 28 that are located inside of body 18.

In the embodiment of FIG. 2, the matrix material being applied to the reinforcement inside of head 16 is a multi-part matrix. In particular, the matrix includes a first matrix component (e.g., an epoxy resin, a polyester resin, a vinylester resin, or another type of resin) and at least a second matrix component (e.g., a hardener, a catalyst, or another initiator) that, under controlled conditions, together react or causes a reaction to form a cured and hardened matrix encasing the associated reinforcements. At least two separate chambers 28 are located inside of body 18 of FIG. 2, for separately coating the reinforcements with the first and second matrix components. These chambers 28 include a first chamber 28a that is sequentially arranged with a second chamber 28b, in relation to a travel direction of the reinforcement(s) through head 16 (e.g., from spool 21 to nozzle 20). In this example, first chamber 28a contains one of the first and second matrix components, while second chamber 28b contains the other of the first and second matrix components. It should be noted that both sequential orders of the first and second matrix components within body 18 are contemplated in this disclosure.

The first and/or second matrix components may be supplied to the corresponding chamber(s) 28a, 28b in several different ways. For example, one or both of the first and second matrix components may be provided as a gas-, a liquid-, or a powder-stream via a jet 30 (see FIG. 4); as a liquid bath via a supply inlet 32 or jet 30; as a suspended powder via a pressurized conduit 34, supply inlet 32, or jet 30; or in another manner known in the art. In some embodiments, a regulating device 36 (e.g., opposing rollers, a squeegee, a wiper, a brush, an air jet, etc.) may be disposed between first and second chambers 28a and 28b (and/or downstream of second chamber 28b) to remove excess matrix component from the reinforcements prior to the coated reinforcements entering second chamber 28b (and/or just prior to the coated reinforcement entering nozzle 20). In this way, mixing of any excess matrix component clinging to the reinforcements, with the subsequent supply of matrix component inside of second chamber 28b (and corresponding premature curing of the mixture inside of second chamber 28b), may be inhibited. In some applications, a mechanical means (e.g., a tube surrounding the catalyst-coated reinforcement and extending to jet(s) 30) may be used to inhibit premature mixing of the catalyst with the base matrix. In other embodiments, curing of the matrix components may primarily initiate or proceed rapidly only when a temperature of the matrix components exceeds a minimum threshold, regardless of undesired mixing inside second chamber 28b. In these embodiments, body 18 of head 16 may be maintained below the minimum threshold, to inhibit premature curing.

It should be noted that, while a single jet 30 is shown as being oriented generally orthogonal to an axis of the reinforcement passing through head 16, it is contemplated that any number of jets 30 could be utilized and oriented at a different angle, if desired. For example, jet(s) 30 could be tilted downward toward nozzle 20 and at an oblique angle relative to the axis of the reinforcement. This may help to reduce splashing and contamination of catalyst within matrix reservoir 28, in some applications. In addition, it is contemplated that a purge fluid (e.g., mineral oil) could be periodically (e.g., at a start and/or end of a fabrication event) passed through jet(s) 30, if desired.

As the reinforcements pass through first and second chambers 28a, 28b, the reinforcements may be coated with overlapping inner and outer layers of the first and second matrix components. In some embodiments, the layers remain substantially separated until the reinforcements reach nozzle 20. In other embodiments, some mixing of the first and second matrix components at their corresponding boundaries occurs, prior to the reinforcements reaching nozzle 20. Regardless of how much mixing occurs upstream of nozzle 20, the mechanical motion of the coated reinforcements converging and being discharged through nozzle 20 may enhance mixing of the first and second matrix components. And upon exiting nozzle 20, curing may begin or speed up as both a result of the increased mixing and exposure to energy from cure enhancers 24. It is contemplated that, in some applications, cure enhancers 24 may be unnecessary, as the mixing of the two matrix components (and/or exposure of the mixed components to ambient conditions) at nozzle 20 may be sufficient for complete curing. It is further contemplated that nozzle 20 (e.g., a tip end of nozzle 20) could be energized (e.g., heated, vibrated, etc.) to increase a rate of cure, if desired.

In some embodiments, in addition to the two matrix components described above, an additive or third matrix component may be mixed into one or both of the first and second matrix components. The additive may include, for example, a filler and/or an additional or different catalyst. For instance, a UV cure initiator (e.g., different from the second matrix component) could be mixed into the first matrix component, if desired. The UV cure initiator may be sufficient to raise a temperature of the matrix mixture coating the reinforcements to the minimum threshold temperature discussed above, upon exposure to light energy from cure enhancers 24. Thereafter, the second matrix component in the mixture coating the reinforcements may be triggered to cause full and complete curing of the first matrix component in the mixture.

In some situations, the reinforcements being fed into head 16 may include many (e.g., thousands) of individual fibers that are bound, woven, twisted or otherwise gathered together. In these situations, it can be difficult to ensure that a sufficient amount of the first and/or second matrix components coats each of the individual fibers. This may be even more difficult when large tows or thick ribbons of fibers are passed through head 16 at high speeds. For this reason, head 16 may be equipped with one or more fiber-teasing mechanisms 38 that help to separate and/or flatten the tows or ribbons, such that the matrix components can penetrate to the centermost fibers more thoroughly and/or quicker. Mechanisms 38 may be located inside and/or outside of body 18, at a position upstream of and/or between chamber(s) 28. Mechanisms 38 may include, for example, brushes, a tortuous path of protrusions (e.g., rollers, fingers, or stationary bumps), air and/or resin jets, and other similar devices.

Figure 3:
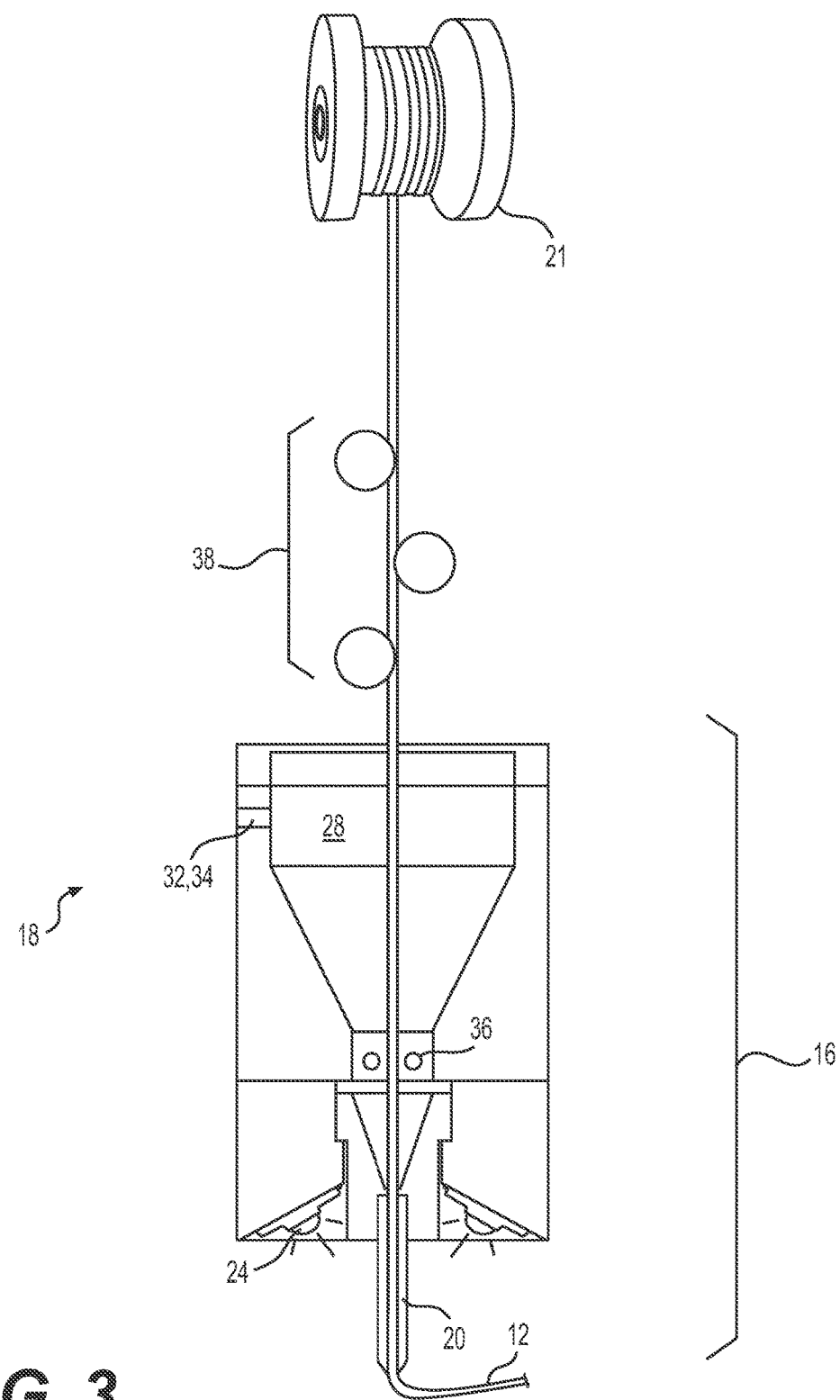

FIG. 3 illustrates an alternative embodiment of head 16 that is also configured to discharge reinforcements coated in a multi-part matrix. In this embodiment, however, body 18 includes a single chamber 28. The single chamber 28 may hold either the first matrix component or the second matrix component discussed above, with or without the additive. The remaining matrix component may already coat the reinforcement and be supplied to head 16 as a prepreg material (e.g., from spool 21 and/or from an upstream and offboard coating chamber—not shown). In other words, head 16 may be configured to apply only part of the multi-part matrix, with the remaining part(s) already being applied to the reinforcements at an earlier time and/or upstream location. In this embodiment, care should be taken to ensure that the prepreg material is kept at conditions that extend life of the material prior to the material being fed into head 16, for example, in dry, cool, and/or dark conditions.

Figure 4:
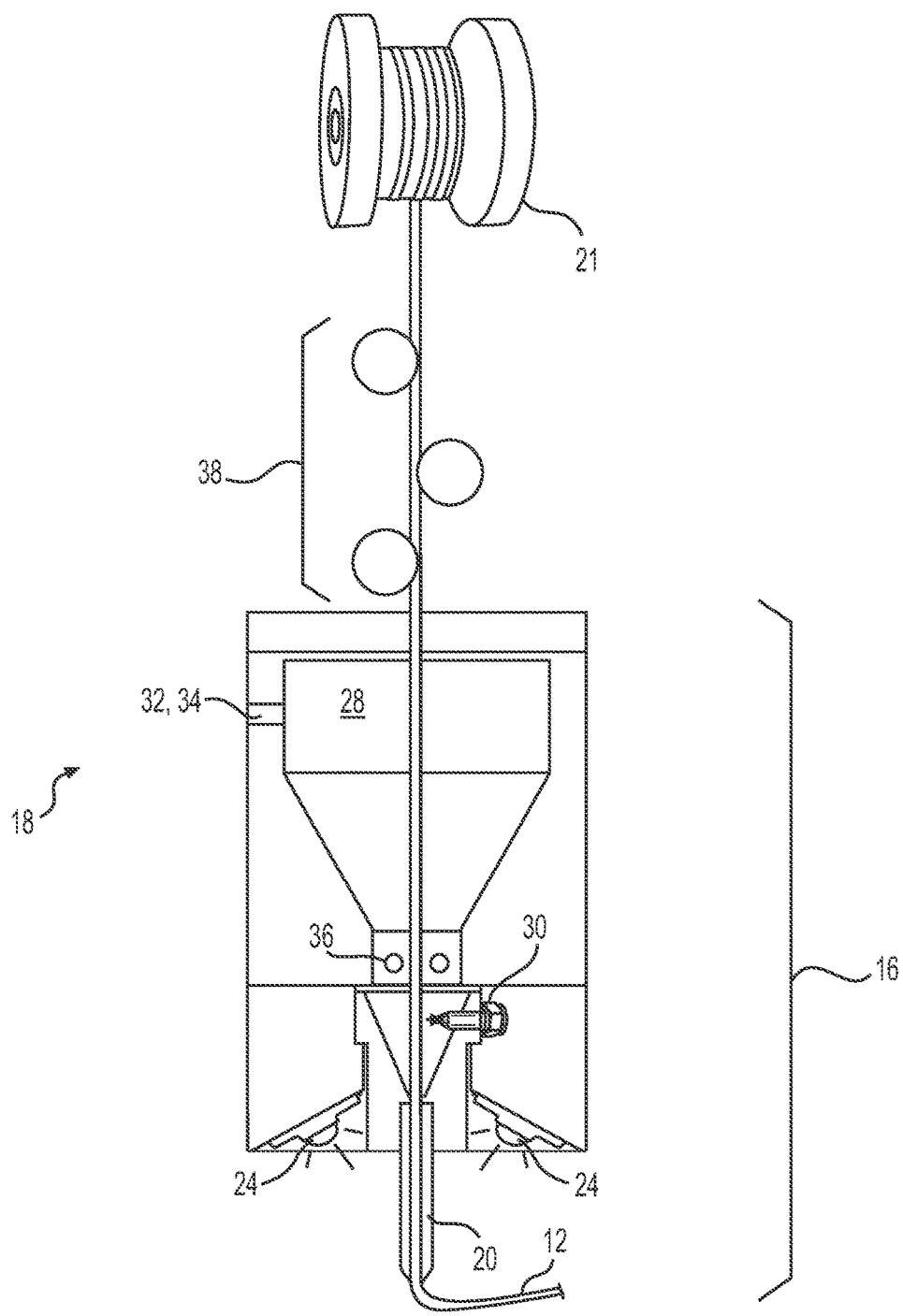

FIG. 4 illustrates another embodiment having a single-chamber head 16, which is also configured to discharge reinforcements coated in a multi-part matrix. Like the embodiment of FIG. 3, the single chamber 28 of FIG. 4 may hold either the first matrix component or the second matrix component discussed above (with or without the additive). The remaining matrix component may be injected, sprayed, or otherwise advanced (e.g., via jet 30, inlet 32, and/or conduit 34) into head 16 at a discharge end. In one example, the remaining matrix component is advanced into body 18 at a discharge end of chamber 28, just upstream of nozzle 20. In another embodiment, the remaining matrix component is advanced directly into nozzle 20. The location of the matrix component advancement should be far enough upstream of the tip end of nozzle 20 to ensure adequate mixing of the matrix components, yet downstream enough to inhibit premature curing inside of nozzle 20. It is contemplated that the reinforcements fed into head 16, in the embodiment of FIG. 4, may include dry fibers or fibers pre-impregnated with another material (e.g., the additive), if desired.

Regardless of the particular embodiment (e.g., the embodiment of FIG. 2, FIG. 3, or FIG. 4) utilized to fabricate structure 12, structure 12 may be comprised of at least three primary constituents. As described above, these constituents may include the reinforcement (e.g., the continuous fibers, tows, ribbons, sheets, etc.), the first matrix component (e.g., the resin, such as an epoxy resin), and the second matrix component (e.g., the hardener, catalyst, initiator, etc.). And in some embodiments, the additive (e.g., the UV cure initiator) may be mixed into the first and/or second matrix components at any desired point in the manufacturing process. For the purposes of this disclosure, the reinforcement may comprise about (e.g., within engineering tolerances) 35-70% (e.g., by weight and/or volume) of structure 12; the first matrix component may comprise about 30-50% of structure 12, and the second matrix component may comprise about 0.1-10% of structure 12. In embodiments including the additive, the additive may comprise about 0-10%.

INDUSTRIAL APPLICABILITY

The disclosed system may be used to continuously manufacture composite structures having any desired cross-sectional shape, length, density, and/or strength. The composite structures may include any number of different reinforcements of the same or different types, diameters, shapes, configurations, and consists, and/or any number of different matrixes. Operation of system 10 will now be described in detail.

At a start of a manufacturing event, information regarding a desired structure 12 may be loaded into system 10 (e.g., into controller 26 that is responsible for regulating operation of support 14, cure enhancer(s) 24, jet(s) 30, regulating device(s) 36, fiber-teasing mechanism(s) 38, and/or any other associated components). This information may include, among other things, a size (e.g., diameter, wall thickness, length, etc.), a contour (e.g., a trajectory), surface features (e.g., ridge size, location, thickness, length; flange size, location, thickness, length; etc.), connection geometry (e.g., locations and sizes of couplings, tees, splices, etc.), location-specific matrix stipulations, location-specific reinforcement stipulations, desired cure rates, cure locations, cure shapes, cure amounts, etc. It should be noted that this information may alternatively or additionally be loaded into system 10 at different times and/or continuously during the manufacturing event, if desired.

Based on the component information, a specific nozzle 20 and/or cure enhancer configuration may be connected to head 16 (e.g., to the discharge end of body 18), and one or more different (e.g., different sizes, shapes, and/or types of) reinforcements and/or matrix materials may be selectively installed within system 10 and/or continuously supplied into nozzle 20. The corresponding reinforcements (e.g., prepreg or dry fibers, tows, ribbons, or sheets) may be passed through one or more fiber-teasing mechanisms 38 (e.g., between the bristles of adjacent brushes, and/or over or around protrusions, etc.) and nozzle 20, and thereafter connected to a pulling machine (not shown) and/or to a mounting fixture (e.g., to anchor point 22). Installation of the matrix material may include filling chamber(s) 28 and/or coupling of an extruder (not shown) to head 16.

Head 16 may be moved by support 14 under the regulation of controller 26 to cause matrix-coated reinforcements to be placed against or on a corresponding anchor point 22. Cure enhancers 24 may then be selectively activated (e.g., turned on/off and/or intensity-adjusted by controller 26) to cause hardening of the matrix material surrounding the reinforcements, thereby bonding the reinforcements to anchor point 22.

The component information may then be used to control operation of system 10. For example, the reinforcements may be pulled through fiber-teasing mechanism(s) 38; separated and/or flattened; submerged within the first matrix component, wrung out by regulating device 36; submerged within the second matrix component; and then discharged from nozzle 20. Controller 26 selectively cause support 14 to move head 16 in a desired manner at this time, such that an axis of the resulting structure 12 follows a desired trajectory (e.g., a free-space, unsupported, 3-D trajectory). In addition, cure enhancers 24 may be selectively activated by controller 26 during material discharge to initiate, speed up, or complete hardening of the liquid matrix mixture. Once structure 12 has grown to a desired length, structure 12 may be disconnected (e.g., severed) from head 16 in any desired manner.

It will be apparent to those skilled in the art that various modifications and variations can be made to the disclosed systems and head. Other embodiments will be apparent to those skilled in the art from consideration of the specification and practice of the disclosed systems and heads. It is intended that the specification and examples be considered as exemplary only, with a true scope being indicated by the following claims and their equivalents.

What is claimed is:
1. A method of additively manufacturing a composite structure, comprising:
directing a continuous reinforcement into a print head;
coating the continuous reinforcement with a first matrix component inside of the print head;

coating the continuous reinforcement with a second matrix component that is different from the first matrix component;

discharging the continuous reinforcement through a nozzle of the print head; and moving the print head in multiple dimensions during the discharging, wherein the first and second matrix components interact to cause hardening of a matrix around the continuous reinforcement.

2. The method of claim 1, wherein:

the first matrix component is a resin; and the second matrix component is one of a catalyst, a hardener, and an initiator.

3. The method of claim 2, wherein coating the continuous reinforcement with the second matrix component includes coating the continuous reinforcement inside the print head with the second matrix component after the continuous reinforcement has been coated with the first matrix component.

4. The method of claim 3, wherein coating the continuous reinforcement with the second matrix component includes at least one of directing the second matrix component into the print head at a discharge end of a first matrix component chamber or directing the second matrix component into the nozzle.

5. The method of claim 2, wherein coating the continuous reinforcement with the second matrix component includes coating the continuous reinforcement with the second matrix component before the continuous reinforcement has been coated with the first matrix component.

6. The method of claim 5, wherein coating the continuous reinforcement with the second matrix component includes coating the continuous reinforcement prior to directing the continuous reinforcement into the print head.

7. The method of claim 1, further including exposing a mixture of the first and second matrix components coating the continuous reinforcement to a cure energy after the continuous reinforcement has been discharged from the nozzle.

8. The method of claim 6, wherein the cure energy is UV light.

9. The method of claim 1, further including at least one of separating and flattening the continuous reinforcement prior to coating the continuous reinforcement with at least one of the first and second matrix components.

10. The method of claim 1, wherein coating the continuous reinforcement with the first matrix component includes submerging the continuous reinforcement in a bath of the first matrix component.

11. The method of claim 1, wherein coating the continuous reinforcement with the first matrix component includes exposing the continuous reinforcement to at least one of a gas and a powder of the first matrix component.

12. A method of additively manufacturing a composite structure, comprising:

directing a continuous reinforcement that has been coated with a catalyst into a print head;

coating the continuous reinforcement with a resin that is different from the catalyst inside of the print head;

discharging the continuous reinforcement through a nozzle of the print head; and moving the print head in multiple dimensions during the discharging.

13. The method of claim 12, further including:

coating the continuous reinforcement with the catalyst; and at least partially curing the catalyst prior to the continuous reinforcement entering the print head.

14. The method of claim 12, further including exposing a mixture of the catalyst and the resin coating the continuous reinforcement to a cure energy after the continuous reinforcement has been discharged from the nozzle.

15. The method of claim 14, wherein the cure energy is UV light.

16. The method of claim 12, wherein coating the continuous reinforcement with the resin includes at least one of submerging the continuous reinforcement in a bath of the resin and spraying resin into the continuous reinforcement.

17. A method of additively manufacturing a composite structure, comprising:

directing a continuous reinforcement through a catalyst bath inside a print head;

directing the continuous reinforcement through a resin bath inside of the print head;

discharging the continuous reinforcement through a nozzle of the print head; and moving the print head in multiple dimensions during the discharging.

18. The method of claim 17, further including exposing a mixture of the catalyst and the resin coating the continuous reinforcement to a cure energy after the continuous reinforcement has been discharged from the nozzle.

19. The method of claim 18, wherein the cure energy is UV light.

20. The method of claim 17, further including at least one of separating and flattening the continuous reinforcement prior to directing the continuous reinforcement through at least one of the catalyst bath and the resin bath.

* * * * *